(12) United States Patent
Kumar et al.

(10) Patent No.: US 12,159,257 B2
(45) Date of Patent: Dec. 3, 2024

(54) AUTOMATICALLY PRIORITIZING SUPPLY CHAIN-RELATED DEMAND USING ARTIFICIAL INTELLIGENCE TECHNIQUES

(71) Applicant: Dell Products L.P., Round Rock, TX (US)

(72) Inventors: Dhilip S. Kumar, Bangalore (IN); Sujit Kumar Sahoo, Bangalore (IN); Bijan Kumar Mohanty, Austin, TX (US); Hung T. Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 434 days.

(21) Appl. No.: 17/575,808

(22) Filed: Jan. 14, 2022

(65) Prior Publication Data

US 2023/0230028 A1    Jul. 20, 2023

(51) Int. Cl.
*G06Q 10/087*    (2023.01)
*G06N 3/04*    (2023.01)

(52) U.S. Cl.
CPC ............. *G06Q 10/087* (2013.01); *G06N 3/04* (2013.01)

(58) Field of Classification Search
CPC .. G06Q 10/087; G06Q 10/06315; G06N 3/04; G06N 3/045; G06N 3/08; G06N 5/01
USPC .......................................................... 705/28
See application file for complete search history.

(56) References Cited

U.S. PATENT DOCUMENTS

| | | | |
|---|---|---|---|
| 7,386,358 B2 | 6/2008 | Geroulo | |
| 7,493,184 B2 | 2/2009 | Geroulo | |
| 8,417,549 B2 * | 4/2013 | Rakesh | G06Q 30/0202 705/7.11 |
| 11,599,793 B2 * | 3/2023 | Dinh | G06F 40/30 |
| 2017/0039500 A1 | 2/2017 | Leidner et al. | |
| 2022/0343244 A1 * | 10/2022 | Yesudas | G06N 5/04 |

* cited by examiner

*Primary Examiner* — Garcia Ade
(74) *Attorney, Agent, or Firm* — Ryan, Mason & Lewis, LLP (57) ABSTRACT

Methods, apparatus, and processor-readable storage media for automatically prioritizing supply chain-related demand using artificial intelligence techniques are provided herein. An example computer-implemented method includes processing supply-chain related data using a first set of artificial intelligence techniques trained based at least in part on historical demand availability data; processing supply-chain related data using a second set of artificial intelligence techniques trained based at least in part on historical supply availability data; processing supply-chain related data using a third set of artificial intelligence techniques trained based at least in part on historical production availability data; prioritizing multiple orders within a supply chain environment by processing, using a fourth set of artificial intelligence techniques, results from the first set of artificial intelligence techniques, the second set of artificial intelligence techniques, and the third set of artificial intelligence techniques; and performing one or more automated actions based on the prioritization of the multiple orders.

20 Claims, 6 Drawing Sheets

AUTOMATICALLY PRIORITIZING SUPPLY CHAIN-RELATED DEMAND USING ARTIFICIAL INTELLIGENCE TECHNIQUES

FIELD

The field relates generally to information processing systems, and more particularly to data processing using such systems.

BACKGROUND

Objectives of supply chain planning include estimating customer needs and attempting to ensure that customers receive the correct products, through proper channels, in the correct quantities, and in an appropriately timely fashion. However, dynamic and uncertain aspects of various distributed markets and resources render supply chain planning a challenging task. Further, many conventional supply management approaches are based on sets of static rules, which can result in delays and resource wastage.

SUMMARY

Illustrative embodiments of the disclosure provide techniques for automatically prioritizing supply chain-related demand using artificial intelligence techniques. An exemplary computer-implemented method includes processing at least a portion of supply-chain related data using a first set of artificial intelligence techniques trained based at least in part on historical demand availability data related to at least one supply chain environment, processing at least a portion of the supply-chain related data using a second set of artificial intelligence techniques trained based at least in part on historical supply availability data related to the at least one supply chain environment, and processing at least a portion of the supply-chain related data using a third set of artificial intelligence techniques trained based at least in part on historical production availability data related to the at least one supply chain environment. The method also includes prioritizing multiple orders within the at least one supply chain environment by processing, using a fourth set of artificial intelligence techniques, at least a portion of results from the first set of artificial intelligence techniques, at least a portion of results from the second set of artificial intelligence techniques, and at least a portion of results from the third set of artificial intelligence techniques. Further, the method includes performing one or more automated actions based at least in part on the prioritization of the multiple orders.

Illustrative embodiments can provide significant advantages relative to conventional supply management approaches. For example, problems associated with delays and resource wastage are overcome in one or more embodiments through automatically prioritizing supply chain-related demand by combining outputs from multiple data-specific artificial intelligence techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
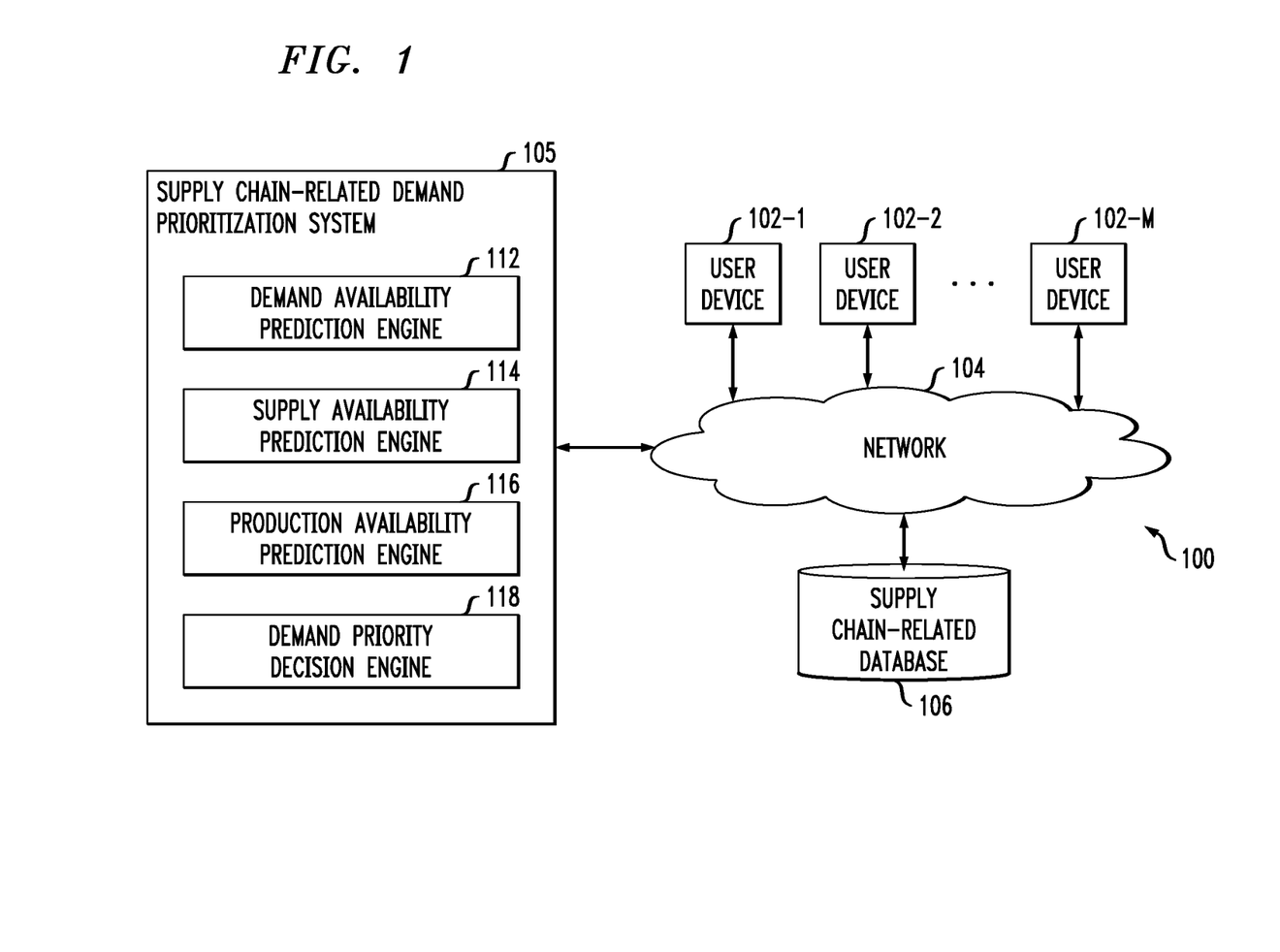
FIG. 1 shows an information processing system configured for automatically prioritizing supply chain-related demand using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is supply chain-related demand prioritization system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, supply chain-related demand prioritization system 105 can have an associated supply chain-related database 106 configured to store data pertaining to orders, shipping information, production information, supply information, demand information, etc.

The supply chain-related database 106 in the present embodiment is implemented using one or more storage systems associated with supply chain-related demand prioritization system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with supply chain-related demand prioritization system 105 are one or more input-output devices, which illustratively comprise keyboards, displays or other types of input-output devices in any combination. Such input-output devices can be used, for example, to support one or more user interfaces to supply chain-related demand prioritization system 105, as well as to support communication between supply chain-related demand prioritization system 105 and other related systems and devices not explicitly shown.

Additionally, supply chain-related demand prioritization system 105 in the FIG. 1 embodiment is assumed to be implemented using at least one processing device. Each such processing device generally comprises at least one processor and an associated memory, and implements one or more functional modules for controlling certain features of supply chain-related demand prioritization system 105.

More particularly, supply chain-related demand prioritization system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows supply chain-related demand prioritization system 105 to communicate over the network 104 with the user devices 102, and illustratively comprises one or more conventional transceivers.

The supply chain-related demand prioritization system 105 further comprises a demand availability prediction engine 112, a supply availability prediction engine 114, a production availability prediction engine 116, and a demand priority decision engine 118.

It is to be appreciated that this particular arrangement of elements 112, 114, 116 and 118 illustrated in the supply chain-related demand prioritization system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for automatically prioritizing supply chain-related demand using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, supply chain-related demand prioritization system 105 and supply chain-related database 106 can be on and/or part of the same processing platform.

An exemplary process utilizing elements 112, 114, 116 and 118 of an example supply chain-related demand prioritization system 105 in computer network 100 will be described in more detail with reference to the flow diagram of FIG. 5.

Accordingly, at least one embodiment includes automatically prioritizing supply chain-related demand using artificial intelligence techniques. As further detailed herein, such an embodiment includes intelligently integrating and managing multiple different artificial intelligence models. Such an embodiment can also include implementing flexible and clustered techniques which can build models pertaining to user behavior, shipment behavior, order behavior, revenue impact behavior, and/or global economic behavior under one environment and/or system with functionality for adding and/or removing one or more of the individual models. This federated approach uses independent models to predict multiple elements (e.g., demand behavior, supplier availability, and production or build availability) needed for improved and/or optimal demand prioritization, which can then be used to prioritize products and/or orders within a supply chain environment. This results in a more flexible supply chain, able to respond to sudden and/or unexpected increases and decreases of demand, and improved customer satisfaction.

As noted herein, demand prioritization commonly involves managing complex demand streams spread across various geographies, wherein such demand streams can have different priorities. In accordance with one or more embodiments, enterprises can allocate resources in response to demand based at least in part on the highest priority demand(s) and the availability of constrained resources needed to fulfill such demand(s). Such an embodiment can include balancing data considerations pertaining, for example, to demand availability, supplier availability (e.g., parts availability to build a system and fulfill a demand), and production or build availability (e.g., line capacity to manufacture and fulfill a demand). More specifically, at least one embodiment includes leveraging an ensemble-based approach to predict demand prioritization by enabling distributed and/or federated machine learning models and/or other artificial intelligence techniques in dynamic environments (i.e., environments with changing input conditions and variable context-based scenarios).

One or more embodiments include calculating the supply of one or more given products for a supply allocation duration a given period, receiving demand orders, allocating supplies within the supply allocation duration period to firm plan arrivals based on a location priority and a demand date, and generating a shipment recommendation for each distributed supply that meets a firm plan appearance. As used herein, a firm plan refers to prioritized orders in both demand and supply scenarios.

Customer-level replenishment planning can also be carried out via one or more embodiments using independent demand logic. The actions carried out via such an embodiment can be executed in a sequence order or a dynamic order, and such an embodiment includes contemplating and/or performing steps of the procedure performed in any suitable order and/or combination according to one or more specific needs.

Ensemble techniques, which include combining multiple artificial intelligence models, can be driven in one or more embodiments based at least on one or more factors such as algorithm diversity, predictor diversity, and meta learning. With respect to algorithm diversity, predictors can be configured to be as independent of one another as possible, and an example means of obtaining various classifiers is to train the classifiers using different algorithms. With respect to predictor diversity, an example means of generating an improved prediction is to aggregate the predictions made by each of multiple predictors and setting the majority chosen as the final prediction. One or more embodiments can include implementing such a technique, for example, if the mode of all predictors is being retrieved. In the context of an ensembled machine learning algorithm (wherein multiple models work together to predict a final value), the mode indicates the most commonly predicted value of all of the models, and the final prediction will be that value. For example, in an ensemble of four machine learning classifiers, if three models predict YES and one model predicts NO, the mode of the predictors is YES, which becomes the final prediction.

With respect to meta learning, at least one embodiment can include splitting a training dataset into multiple subsets, and using a given subset of data to train the predictors. In such an embodiment, the same predictors trained on the given subset are then used to predict the other (held-out) set. By doing this, the cleanness of the projections is ensured because those algorithms never encountered the other data.

As also detailed herein, one or more embodiments include implementing a federated approach to determining demand prioritization by handling each of the multiple functions (e.g., demand availability, supply availability, and production or build availability) in parallel and then using at least one intersection algorithm to identify the orders prioritized for manufacturing. Such an ensemble approach involves multiple separate engines that each use at least one machine learning-based classification algorithm to classify each input order into a priority class. Example machine learning-based classification algorithms that can be utilized and/or implemented in accordance with one or more embodiments can include shallow learning-based algorithms and deep learning-based algorithms. Such shallow learning-based algorithms can include logistics regressions, random forest classifiers, and gradient boosting classifiers, while such deep learning-based algorithms can include artificial neural network-based classifiers (such as further detailed herein). By way of example, in one or more embodiments, such shallow learning-based algorithms and/or deep learning-based algorithms can be utilized as one or more of the first set of artificial intelligence techniques (pertaining to demand availability data), the second set of artificial intelligence techniques (pertaining to supply availability data), the third set of artificial intelligence techniques (pertaining to production availability data), and the fourth set of artificial intelligence techniques (pertaining to a demand priority decision engine), such as described herein (e.g., in connection with the embodiments detailed in FIG. 5).

In at least one embodiment, each engine processes data pertaining to specific features associated with a specific function while classifying a given order. The output of the multiple engines is then input into a demand priority decision engine, which applies at least one intersection algorithm and determines a final list of orders that are to be prioritized for manufacturing. By way merely of example, in the context of determining a list of prioritized orders which can be predicted as YES by a demand engine, supply engine and/or availability engine, an intersection list algorithm can be used. In set theory, the intersection of two sets, A and B, includes the list of elements present in both set A and set B. In at least one embodiment, there are three sets of orders that are used, and the intersection algorithm returns all of the orders indicated as YES in all three sets.

Figure 2:
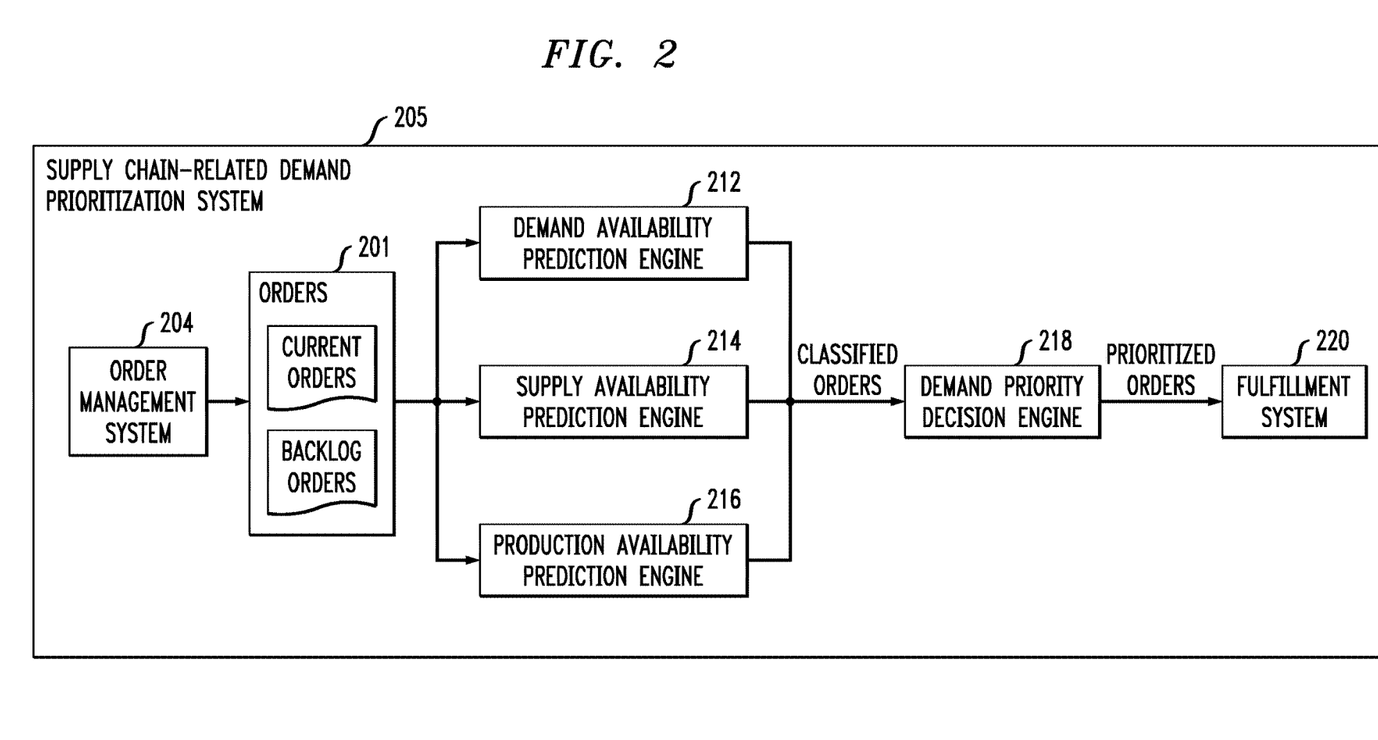
FIG. 2 shows the component architecture of an illustrative embodiment.

FIG. 2 shows the component architecture of an illustrative embodiment. By way of illustration, FIG. 2 depicts supply chain-related demand prioritization system 205, within which order management system 204 outputs data pertaining to orders 201, which includes information pertaining to current orders and backlog orders. Additionally, as depicted in FIG. 2, demand availability prediction engine 212, supply availability prediction engine 214 and production availability prediction engine 216 process and/or are fed a list of orders 201 (including current orders and backlog orders) from the order management system 204.

Each respective prediction engine (212, 214 and 216) deals with the features of the corresponding specific function while classifying orders into groups of YES or NO for prioritization. The classified list of orders from each of these prediction engines can differ, for example, depending upon various attributes. By way of illustration, demand availability prediction engine 212 classification can depend at least in part on attributes such as customer data, products in the order, region-related data, backlog cycle time to classify the order, etc. Additionally, supply availability prediction engine 214 classification can depend at least in part on feature attributes such as product data, item and/or parts-related data, supplier data, quantity-related information, etc. Further, production or build availability prediction engine 216 classification can depend at least in part on feature attributes such as product data, sub-assembly data, manufacturing facility data, etc.

Additionally, in one or more embodiments, the classified orders from the three prediction engines (212, 214 and 216) can differ in terms of which orders are marked prioritized and which ones are not. These three lists of classified orders can then be fed to demand priority decision engine 218, which applies an intersection algorithm and one or more additional rules (e.g., a partial shipment rule) to generate the final list of prioritized orders to be sent to one or more supply chain fulfillment systems 220 for subsequent action(s).

Figure 3:
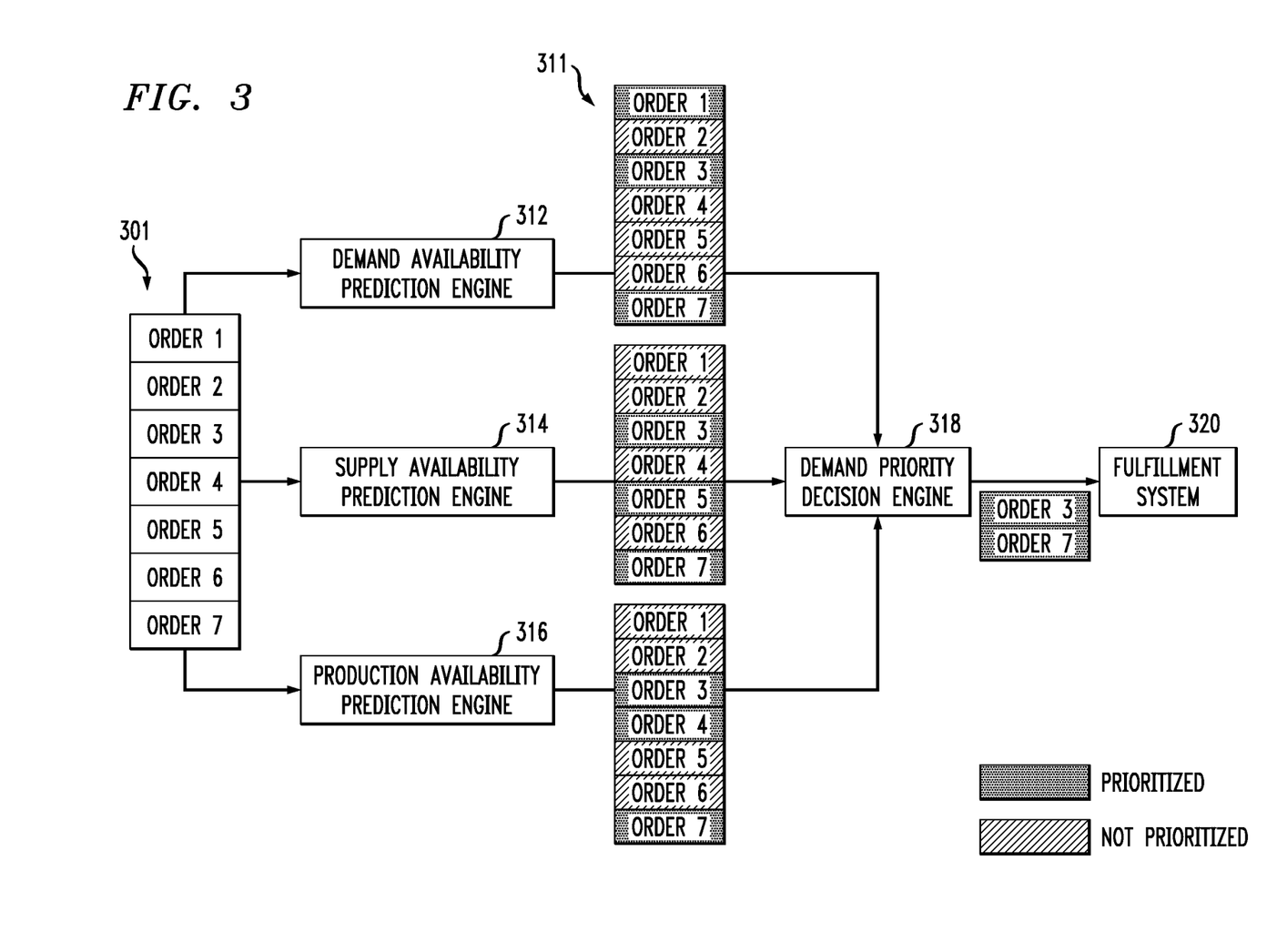
FIG. 3 shows an example workflow of processing orders through different prediction engines and using a decision engine for generating a final prioritized set of orders in an illustrative embodiment.

FIG. 3 shows an example workflow of processing orders through different prediction engines and using a decision engine for generating a final prioritized set of orders in an illustrative embodiment. By way of illustration, FIG. 3 depicts a list of orders 301 fed to and/or processed by demand availability prediction engine 312, supply availability prediction engine 314 and production availability prediction engine 316, which each generate an updated version of the list of orders, updated with a designation of prioritized or not prioritized attributed to each of the orders. The updated versions of the list of orders are fed to and/or processed by demand priority decision engine 318, which generates a final list of prioritized orders to be sent to one or more supply chain fulfillment systems 320 for subsequent action.

In one or more embodiments, availability prediction engines use at least one deep neural network to build classifiers to predict the class of orders based on various features that can vary from one engine to another. The target variable (i.e., dependent variable) of the models is the class or group of the order (e.g., prioritized: YES or prioritized: NO).

Such engines utilize at least one deep neural network by building a dense, multi-layer neural network that can act as a sophisticated classifier. In at least one embodiment, such a neural network includes an input layer, one or more (e.g., two) hidden layers, and an output layer. The input layer can include a number of neurons that match the number of input/independent variables. Also, the neuron on each hidden layer can depend upon the number of neurons in the input layer. The output layer, in one or more embodiments, can include a single neuron, as the neural network represents a binary classification model. The output is either a YES (the input order is prioritized) or NO (the input order is not prioritized). The sole neuron in such an output layer can utilize a sigmoid activation function as a binary classifier model.

Figure 4:
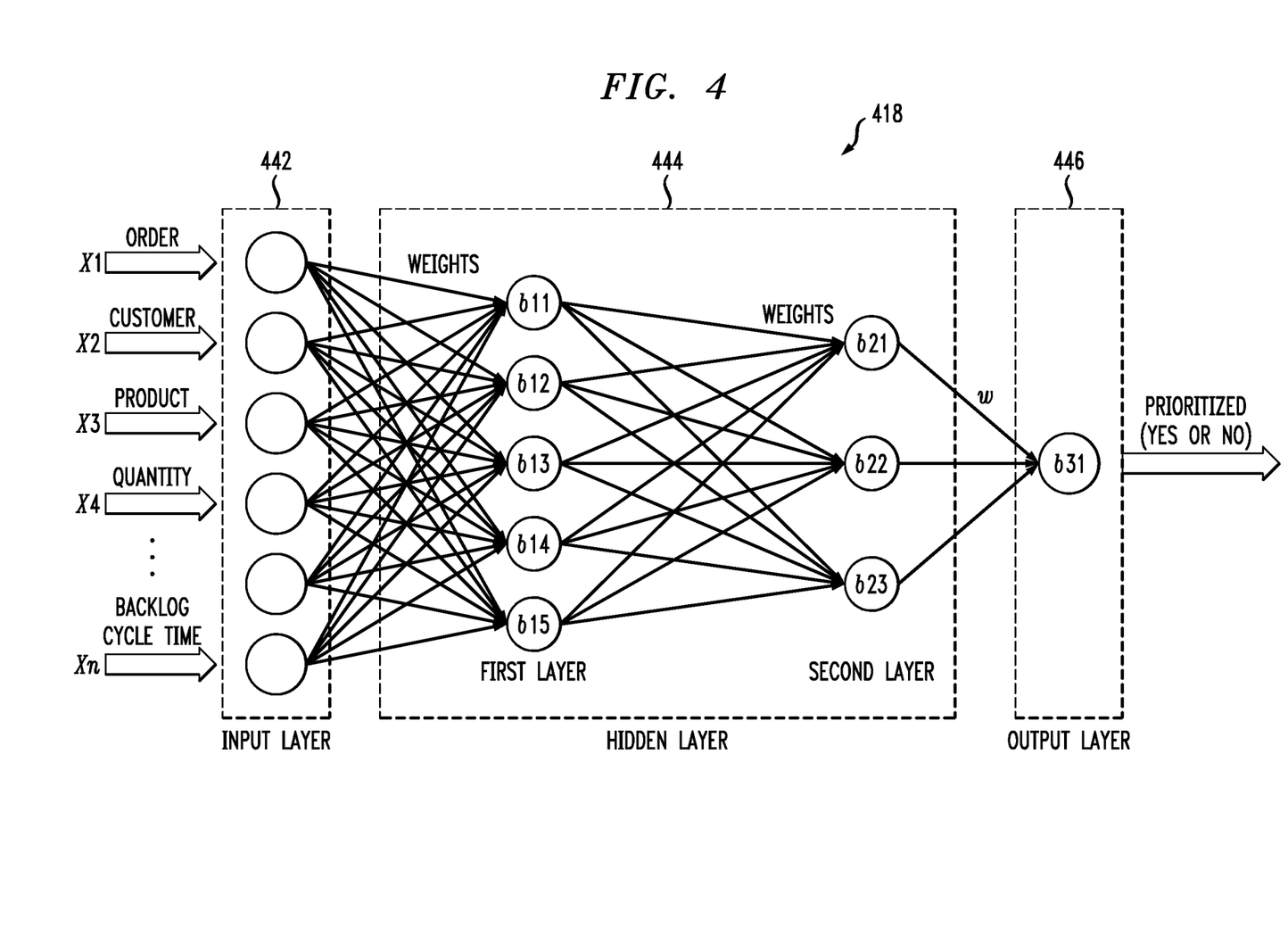
FIG. 4 shows architecture of an example neural network in an illustrative embodiment.

FIG. 4 shows architecture of an example neural network in an illustrative embodiment. By way of illustration, FIG. 4 depicts example architecture of demand priority decision engine 418 in the form of a dense artificial neural network-based (ANN-based) regressor configured and/or implemented to predict whether an order is prioritized. By way of example, in one or more embodiments, the dense ANN-based regressor 418 depicted in FIG. 4 can be utilized as the fourth set of artificial intelligence techniques as described herein (e.g., in connection with the embodiments detailed in FIG. 5). More specifically, FIG. 4 depicts an input layer 442 (which receives inputs such as order information, customer information, product information, quantity information, backlog cycle time information, etc.), hidden layers 444, and output layer 446.

By way merely of example, although FIG. 4 depicts five neurons/nodes in the first layer of hidden layer 444 and three neurons/nodes in the second layer of hidden layer 444, the actual values can depend upon the total number of neurons in the input layer. For instance, one or more embodiments can include calculating the number of nodes in the first hidden layer using an algorithm matching the power of two to the number of input nodes in the input layer 442. For example, if the number of input variables is 19, the number of hidden layer nodes falls in the range of $2^5$. That means the first hidden layer will have $2^5=32$ neurons. The second hidden layer will then contain $2^4=16$ neurons. If there is to be a third hidden layer, that third hidden layer would contain $2^3=8$ neurons.

As also noted herein, in at least one embodiment, the neurons in the hidden layer 444 and output layer 446 contain an activation function that drives if the neuron will fire or not. Further, in one or more embodiments, in the neural network architecture, at least one rectified linear unit (ReLU) activation function is used in the hidden layer 444. Also, as noted, the model is built to function similar to a binary classifier, and the output neuron can correspondingly contain at least one sigmoid activation function.

Considering that one or more embodiments include implementing a dense neural network, each node in such a network will connect. Each connection will have a weight factor, and the nodes will have a bias factor. In at least one embodiment, the neural network randomly sets these weight and bias values, starting as 1 or 0. Each neuron/node can perform a linear calculation by combining the multiplication of each input variable (X1, X2, etc.) with their weight factor(s) and then adding the neuron's bias value. The formula for such calculation can be illustrated as follows:

$$ws11 = X1 \cdot w1 + X2 \cdot w2 + \ldots + b11,$$

wherein ws11 represents the weighted sum of neuron1 of the first layer of hidden layer 444, X1, X2, etc., represent the input values to the model, w1, w2, etc., represent the weight values applied to the connections to neuron1, and b11 represents the bias value of neuron1 of the first layer of hidden layer 444. It should also be appreciated that, in the example embodiment depicted in FIG. 4, b12 represents the bias value of neuron2 of the first layer of hidden layer 444, b13 represents the bias value of neuron3 of the first layer of hidden layer 444, b14 represents the bias value of neuron4 of the first layer of hidden layer 444, b15 represents the bias value of neurons of the first layer of hidden layer 444, b21 represents the bias value of neuron1 of the second layer of hidden layer 444, b22 represents the bias value of neuron2 of the second layer of hidden layer 444, b23 represents the bias value of neuron3 of the second layer of hidden layer 444, and b31 represents the bias value of neuron1 of the output layer 446.

Referring again to ws11 noted above, this weighted sum can serve as input to an activation function (e.g., ReLU) to compute the value of the activation function. Similarly, in one or more embodiments, the weighted sum and activation function values of all other neurons in the given layer are calculated, and these values are fed to the neurons of the next layer. In such an embodiment, the same process is repeated in the next layer of neurons until the values are fed to the neuron of the output layer, where the weighted sum is calculated and compared to the actual target value. Depending upon the difference, the loss value can be calculated.

Such a pass-through of the neural network is a forward propagation that calculates the error and drives a backpropagation through the network to minimize the loss or error at each neuron. Considering, for example, that the error or loss can be generated by all neurons in the network, such a backpropagation can go through each layer from back to forward and attempt to minimize the loss by using at least one gradient descent-based optimization mechanism. Also, given that the neural network implemented in one or more embodiments can be used as a binary classifier, such an embodiment can include using the loss function (e.g., binary cross entropy, adaptive moment estimation (Adam)) as an optimization algorithm, and using accuracy as the metric.

Additionally or alternatively, one or more embodiments can include using root mean squared propagation (RMSProp) as an optimization algorithm.

Also, in one or more embodiments, such backpropagation as detailed above results in adjusting the weight and bias values at each connection and neuron-level to reduce the error or loss. Once all observations of the training data are passed through the neural network, an epoch is completed. In such an embodiment, another forward propagation is initiated with the adjusted weight and bias values, considered as epoch2, and the same process of forward and backpropagation is repeated in the subsequent epochs. This process of repeating the epochs can reduce loss to a value close to 0, at which point the neural network is sufficiently trained for prediction.

As also detailed herein (for example in connection with FIG. 2), one or more embodiments include implementing a demand priority decision engine, which is responsible for combining the predictions from the prediction engines and building the final list of orders prioritized for manufacturing. In such an embodiment, the demand priority decision engine uses an intersection algorithm approach to identify the orders that are prioritized. For example, although all priority prediction engines use the same list of orders as input, the prediction engines' outputs can mark the orders in the list with different priorities. Each prediction engine applies the features specific to the corresponding domain(s), and the demand priority decision engine uses an intersection algorithm and one or more other custom rules to build the final prioritized list of orders. Such custom rules can include, for example, whether partial shipment is allowed or not. The intersection logic between the lists of orders (output by the prediction engines) can be achieved by building sets for each order list from the prediction engines and applying an interaction rule (&).

In such an embodiment, a demand set component, a supply set component, and a build set component can be implemented, for example, using Keras with Tensorflow backend, Python language, Pandas, Numpy and ScikitLearn libraries. A demand set contains prioritized orders from a demand availability prediction engine, a supply set contains prioritized orders from a supply availability prediction engine, and a build set contains prioritized orders from a production or build availability prediction engine. Further, in one or more embodiments, a prioritized set includes and/or encompasses a corresponding demand set, a corresponding supply set, and a corresponding build set.

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

Figure 5:
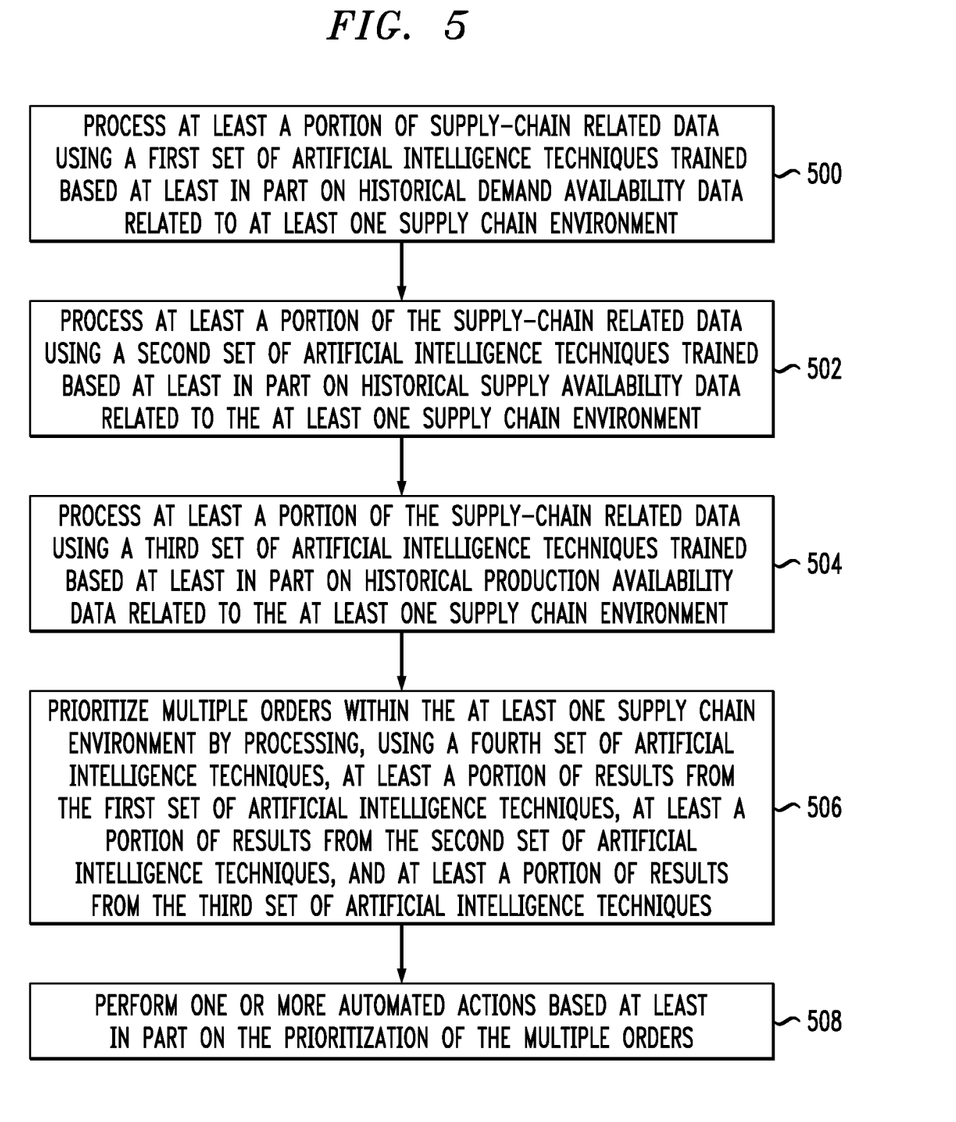
FIG. 5 is a flow diagram of a process for automatically prioritizing supply chain-related demand using artificial intelligence techniques in an illustrative embodiment.

FIG. 5 is a flow diagram of a process for automatically prioritizing supply chain-related demand using artificial intelligence techniques in an illustrative embodiment. It is to be understood that this particular process is only an example, and additional or alternative processes can be carried out in other embodiments.

In this embodiment, the process includes steps 500 through 508. These steps are assumed to be performed by the supply chain-related demand prioritization system 105 utilizing elements 112, 114, 116 and 118.

Step 500 includes processing at least a portion of supply-chain related data using a first set of artificial intelligence techniques trained based at least in part on historical demand availability data related to at least one supply chain environment. Step 502 includes processing at least a portion of the supply-chain related data using a second set of artificial intelligence techniques trained based at least in part on historical supply availability data related to the at least one supply chain environment. Step 504 includes processing at least a portion of the supply-chain related data using a third set of artificial intelligence techniques trained based at least in part on historical production availability data related to the at least one supply chain environment. In one or more embodiments, one or more of the first set of artificial intelligence techniques, the second set of artificial intelligence techniques, and the third set of artificial intelligence techniques include at least one machine learning-based classification algorithm.

Step 506 includes prioritizing multiple orders within the at least one supply chain environment by processing, using a fourth set of artificial intelligence techniques (e.g., the dense ANN-based regressor 418 depicted in example embodiment of FIG. 4), at least a portion of results from the first set of artificial intelligence techniques, at least a portion of results from the second set of artificial intelligence techniques, and at least a portion of results from the third set of artificial intelligence techniques. In at least one embodiment, the fourth set of artificial intelligence techniques includes at least one neural network trained using historical results from the first set of artificial intelligence techniques, historical results from the second set of artificial intelligence techniques, and historical results from the third set of artificial intelligence techniques. In such an embodiment, the at least one neural network includes an input layer, one or more hidden layers, and an output layer, wherein the one or more hidden layers include at least one rectified linear unit activation function, and wherein the output layer includes a sigmoid activation function as binary classification model trained to output an indication that a given input order is prioritized or an indication that the given input order is not prioritized.

In one or more embodiments, processing, using the fourth set of artificial intelligence techniques, includes attributing distinct weights to the at least a portion of results from the first set of artificial intelligence techniques, the at least a portion of results from the second set of artificial intelligence techniques, and the at least a portion of results from the third set of artificial intelligence techniques. In such an embodiment, attributing the distinct weights is based at least in part on one or more of region-related information, season-related information, and trend-related information.

Additionally or alternatively, in at least one embodiment, the results from the first set of artificial intelligence techniques include a first set of prioritization predictions pertaining to the multiple orders, the results from the second set of artificial intelligence techniques include a second set of prioritization predictions pertaining to the multiple orders, and the results from the third set of artificial intelligence techniques include a third set of prioritization predictions pertaining to the multiple orders. Also, in such an embodiment, processing, using the fourth set of artificial intelligence techniques, includes aggregating the first set of prioritization predictions, the second set of prioritization predictions, and the third set of prioritization predictions. Further, in at least one embodiment, processing, using the fourth set of artificial intelligence techniques, can include using one or more of at least one gradient descent-based optimization algorithm, at least one loss function as an optimization algorithm, and using root mean squared propagation as an optimization algorithm.

Step 508 includes performing one or more automated actions based at least in part on the prioritization of the multiple orders. In one or more embodiments, performing one or more automated actions includes allocating resources within the at least one supply chain environment in response to demand based at least in part on the prioritization of the multiple orders. Additionally or alternatively, performing one or more automated actions can include training the fourth set of artificial intelligence techniques based at least in part on information derived from the prioritization of the multiple orders.

It is to be appreciated that one or more embodiments can include using more or fewer sets of artificial intelligence techniques than detailed in connection with FIG. 5. For example, at least one embodiment can include using the first set of artificial intelligence techniques (pertaining to demand availability data), the second set of artificial intelligence techniques (pertaining to supply availability data), and the fourth set of artificial intelligence techniques (pertaining to the demand priority decision engine). Alternatively, at least one embodiment can include using the first set of artificial intelligence techniques (pertaining to demand availability data), the third set of artificial intelligence techniques (pertaining to production availability data), and the fourth set of artificial intelligence techniques (pertaining to the demand priority decision engine). Further, at least one embodiment can include using the second set of artificial intelligence techniques (pertaining to supply availability data), the third set of artificial intelligence techniques (pertaining to production availability data), and the fourth set of artificial intelligence techniques (pertaining to the demand priority decision engine).

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically prioritize supply chain-related demand using artificial intelligence techniques. These and other embodiments can effectively overcome problems associated with delays and resource wastage.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
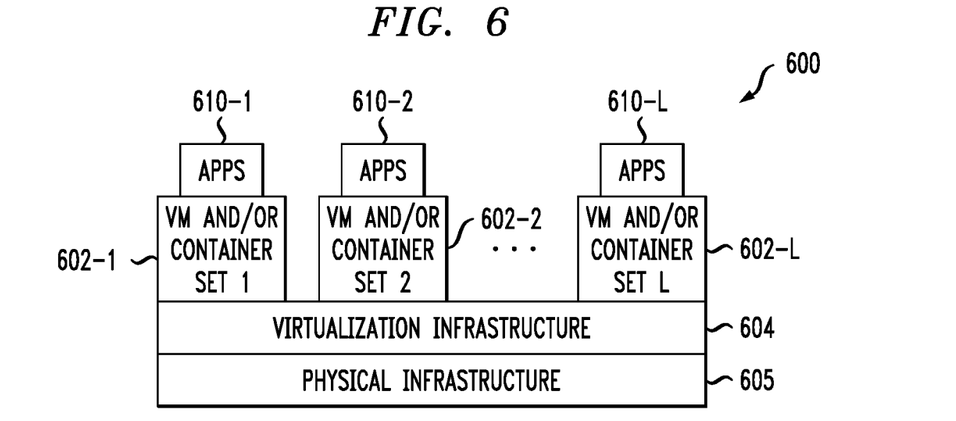
FIGS. 6 and 7 show examples of processing platforms that may be utilized to implement at least a portion of an information processing system in illustrative embodiments.
Figure 7:
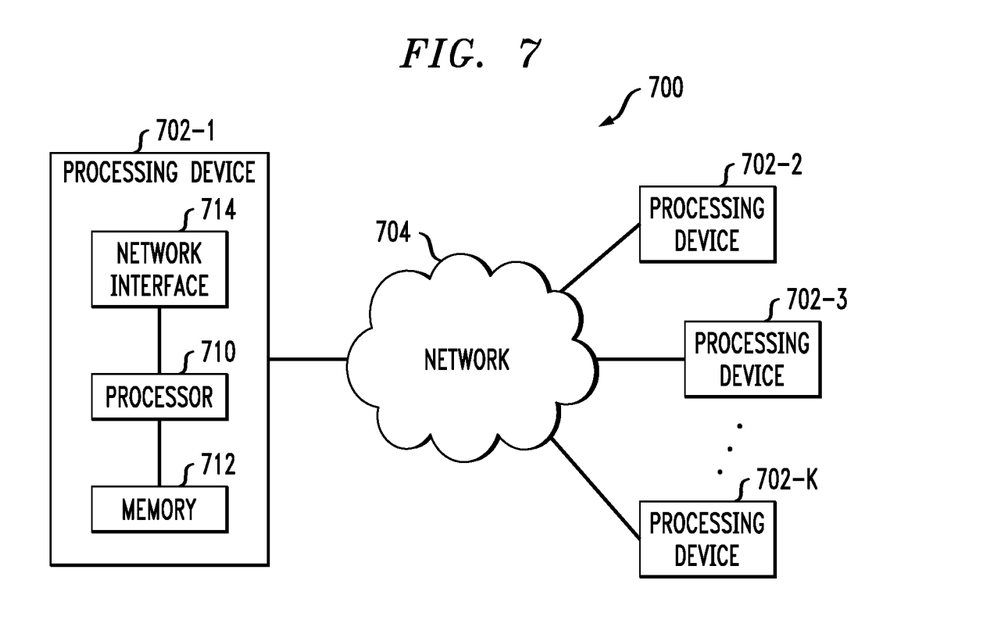

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs)

and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more information processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
processing at least a portion of supply-chain related data using a first set of artificial intelligence techniques trained based at least in part on historical demand availability data related to at least one supply chain environment;
processing at least a portion of the supply-chain related data using a second set of artificial intelligence techniques trained based at least in part on historical supply availability data related to the at least one supply chain environment;
processing at least a portion of the supply-chain related data using a third set of artificial intelligence techniques trained based at least in part on historical production availability data related to the at least one supply chain environment;
prioritizing multiple orders within the at least one supply chain environment by processing, using a fourth set of artificial intelligence techniques, at least a portion of results from the first set of artificial intelligence techniques, at least a portion of results from the second set of artificial intelligence techniques, and at least a portion of results from the third set of artificial intelligence techniques, wherein the fourth set of artificial intelligence techniques comprises at least one neural network trained using historical results from the first set of artificial intelligence techniques, historical results from the second set of artificial intelligence techniques, and historical results from the third set of artificial intelligence techniques; and
performing one or more automated actions based at least in part on the prioritization of the multiple orders;
wherein the method is performed by at least one processing device comprising a processor coupled to a memory.

2. The computer-implemented method of claim 1, wherein the at least one neural network comprises an input layer, one or more hidden layers, and an output layer, wherein the one or more hidden layers comprise at least one rectified linear unit activation function, and wherein the output layer comprises a sigmoid activation function as binary classification model trained to output an indication that a given input order is prioritized or an indication that the given input order is not prioritized.

3. The computer-implemented method of claim 1, wherein processing, using the fourth set of artificial intelligence techniques, comprises attributing distinct weights to the at least a portion of results from the first set of artificial intelligence techniques, the at least a portion of results from the second set of artificial intelligence techniques, and the at least a portion of results from the third set of artificial intelligence techniques.

4. The computer-implemented method of claim 3, wherein attributing the distinct weights is based at least in part on one or more of region-related information, season-related information, and trend-related information.

5. The computer-implemented method of claim 1, wherein the results from the first set of artificial intelligence techniques comprises a first set of prioritization predictions pertaining to the multiple orders, the results from the second set of artificial intelligence techniques comprises a second set of prioritization predictions pertaining to the multiple orders, and the results from the third set of artificial intelligence techniques comprises a third set of prioritization predictions pertaining to the multiple orders, and wherein processing, using the fourth set of artificial intelligence techniques, comprises aggregating the first set of prioritization predictions, the second set of prioritization predictions, and the third set of prioritization predictions.

6. The computer-implemented method of claim 1, wherein performing one or more automated actions comprises allocating resources within the at least one supply chain environment in response to demand based at least in part on the prioritization of the multiple orders.

7. The computer-implemented method of claim 1, wherein performing one or more automated actions comprises training the fourth set of artificial intelligence techniques based at least in part on information derived from the prioritization of the multiple orders.

8. The computer-implemented method of claim 1, wherein one or more of the first set of artificial intelligence techniques, the second set of artificial intelligence techniques, and the third set of artificial intelligence techniques comprise at least one machine learning-based classification algorithm.

9. The computer-implemented method of claim 1, wherein processing, using the fourth set of artificial intelligence techniques, comprises using one or more of at least one gradient descent-based optimization algorithm, at least one loss function as an optimization algorithm, and using root mean squared propagation as an optimization algorithm.

10. A non-transitory processor-readable storage medium having stored therein program code of one or more software programs, wherein the program code when executed by at least one processing device causes the at least one processing device:
to process at least a portion of supply-chain related data using a first set of artificial intelligence techniques trained based at least in part on historical demand availability data related to at least one supply chain environment;
to process at least a portion of the supply-chain related data using a second set of artificial intelligence techniques trained based at least in part on historical supply availability data related to the at least one supply chain environment;
to process at least a portion of the supply-chain related data using a third set of artificial intelligence techniques trained based at least in part on historical production availability data related to the at least one supply chain environment;
to prioritize multiple orders within the at least one supply chain environment by processing, using a fourth set of artificial intelligence techniques, at least a portion of results from the first set of artificial intelligence techniques, at least a portion of results from the second set of artificial intelligence techniques, and at least a portion of results from the third set of artificial intelligence techniques, wherein the fourth set of artificial intelligence techniques comprises at least one neural network trained using historical results from the first set of artificial intelligence techniques, historical results from the second set of artificial intelligence techniques, and historical results from the third set of artificial intelligence techniques; and
to perform one or more automated actions based at least in part on the prioritization of the multiple orders.

11. The non-transitory processor-readable storage medium of claim 10, wherein processing, using the fourth set of artificial intelligence techniques, comprises attributing distinct weights to the at least a portion of results from the first set of artificial intelligence techniques, the at least a portion of results from the second set of artificial intelligence techniques, and the at least a portion of results from the third set of artificial intelligence techniques.

12. The non-transitory processor-readable storage medium of claim 10, wherein the results from the first set of artificial intelligence techniques comprises a first set of prioritization predictions pertaining to the multiple orders, the results from the second set of artificial intelligence techniques comprises a second set of prioritization predictions pertaining to the multiple orders, and the results from the third set of artificial intelligence techniques comprises a third set of prioritization predictions pertaining to the multiple orders, and wherein processing, using the fourth set of artificial intelligence techniques, comprises aggregating the first set of prioritization predictions, the second set of prioritization predictions, and the third set of prioritization predictions.

13. The non-transitory processor-readable storage medium of claim 10, wherein performing one or more automated actions comprises allocating resources within the at least one supply chain environment in response to demand based at least in part on the prioritization of the multiple orders.

14. An apparatus comprising:
at least one processing device comprising a processor coupled to a memory;
the at least one processing device being configured:
to process at least a portion of supply-chain related data using a first set of artificial intelligence techniques trained based at least in part on historical demand availability data related to at least one supply chain environment;
to process at least a portion of the supply-chain related data using a second set of artificial intelligence techniques trained based at least in part on historical supply availability data related to the at least one supply chain environment;
to process at least a portion of the supply-chain related data using a third set of artificial intelligence techniques trained based at least in part on historical production availability data related to the at least one supply chain environment;
to prioritize multiple orders within the at least one supply chain environment by processing, using a fourth set of artificial intelligence techniques, at least a portion of results from the first set of artificial intelligence techniques, at least a portion of results from the second set of artificial intelligence techniques, and at least a portion of results from the third set of artificial intelligence techniques, wherein the fourth set of artificial intelligence techniques comprises at least one neural network trained using historical results from the first set of artificial intelligence techniques, historical results from the second set of artificial intelligence techniques, and historical results from the third set of artificial intelligence techniques; and
to perform one or more automated actions based at least in part on the prioritization of the multiple orders.

15. The apparatus of claim 14, wherein processing, using the fourth set of artificial intelligence techniques, comprises attributing distinct weights to the at least a portion of results from the first set of artificial intelligence techniques, the at least a portion of results from the second set of artificial intelligence techniques, and the at least a portion of results from the third set of artificial intelligence techniques.

16. The apparatus of claim 14, wherein the results from the first set of artificial intelligence techniques comprises a first set of prioritization predictions pertaining to the multiple orders, the results from the second set of artificial intelligence techniques comprises a second set of prioritization predictions pertaining to the multiple orders, and the results from the third set of artificial intelligence techniques comprises a third set of prioritization predictions pertaining to the multiple orders, and wherein processing, using the fourth set of artificial intelligence techniques, comprises aggregating the first set of prioritization predictions, the second set of prioritization predictions, and the third set of prioritization predictions.

17. The apparatus of claim 14, wherein performing one or more automated actions comprises allocating resources within the at least one supply chain environment in response to demand based at least in part on the prioritization of the multiple orders.

18. The apparatus of claim 14, wherein performing one or more automated actions comprises training the fourth set of artificial intelligence techniques based at least in part on information derived from the prioritization of the multiple orders.

19. The apparatus of claim 14, wherein one or more of the first set of artificial intelligence techniques, the second set of artificial intelligence techniques, and the third set of artificial intelligence techniques comprise at least one machine learning-based classification algorithm.

20. The apparatus of claim 14, wherein processing, using the fourth set of artificial intelligence techniques, comprises using one or more of at least one gradient descent-based optimization algorithm, at least one loss function as an optimization algorithm, and using root mean squared propagation as an optimization algorithm.

* * * * *